Patented Feb. 14, 1939

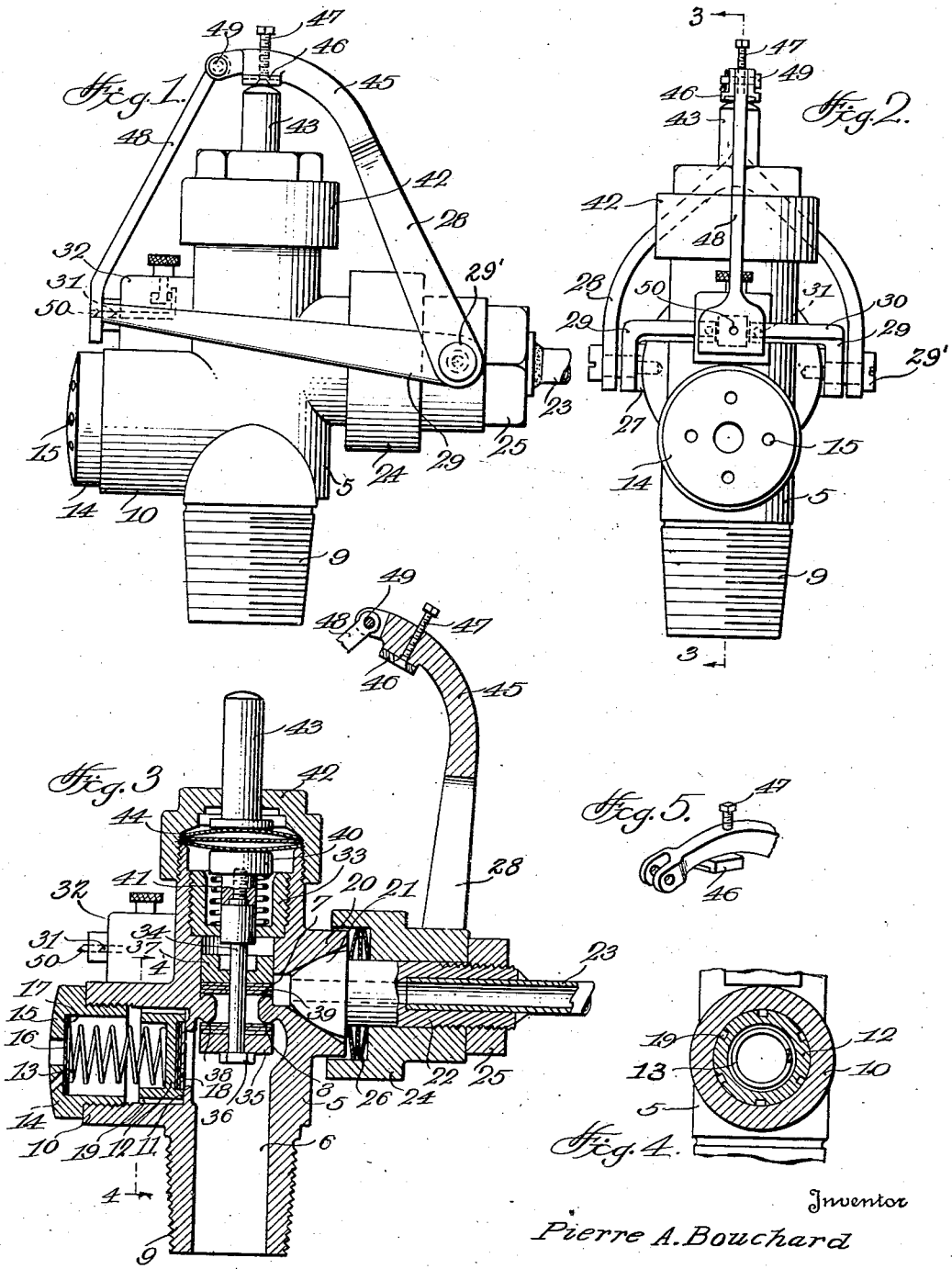

2,147,084

UNITED STATES PATENT OFFICE 2,147,084

VALVE

Pierre A. Bouchard, Miami, Fla.

Application January 26, 1938, Serial No. 187,086

8 Claims. (Cl. 137—69)

This invention relates to improvements in valves particularly adapted for use with tanks for holding gases under high pressure.

It is an object of the invention to provide a valve having mechanical means to facilitate the opening and closing of the valve without the use of wrenches or other tools and thus prevent injury to the valve seat and consequent leakage which frequently results from the present methods of opening and closing valves of this type.

A further object of the invention resides in providing mechanical means for automatically opening and closing the valve, together with means for locking the valve in open position.

A still further object of the invention resides in providing mechanical means for connecting and dis-connecting the service conduit to the discharge port of the valve, operable in conjunction with the opening and closing means.

Another object of the invention resides in providing a valve of the above-mentioned character which is simple and durable in construction, reliable and efficient in operation and inexpensive to manufacture.

Other objects and advantages of the invention will be apparent during the course of the following description.

In the accompanying drawing, forming a part of this specification and in which like numerals are employed to designate like parts throughout the same, Fig. 1 is a side elevation of the improved valve, Fig. 2 is a end view of the same, Fig. 3 is a longitudinal section taken on line 3—3 of Fig. 2, Fig. 4 is a section taken on line 4—4 of Fig. 3, and, Fig. 5 is a fragmentary perspective view of the valve control lever.

In the drawing, wherein for the purpose of illustration, I have shown a preferred embodiment of my invention, the numeral 5 denotes a valve casing having a longitudinal bore 6 therethrough provided, intermediate its length, with opposed valve seats 7 and 8. The lower end of the valve casing is tapered and exteriorly screw-threaded, as at 9, for attaching the valve to the tank containing the gases, not shown. The casing is provided with a radially extending relief port 10, below the valve seat 8, which communicates with the bore 6. A valve seat 11 is formed at the jointure of the relief port with the bore 6 and a valve member 12 is normally held seated on the seat 11 by a coil spring 13 which is compressed by the cap 14 threadedly engaged in the outer end of the relief port. The cap 14 is provided with a series of apertures 15, the inner ends of which are covered by a wire mesh disk 16 held against the inside of the cap by the spring 13 which has one end seated in a recess formed in the valve member 12 and its opposite end bearing against a ring bushing 17. The seating face of the valve member 12 is covered with suitable packing 18 and the sides of the valve member are formed with longitudinal channels 19 for passage of the gases when the valve is unseated. A discharge port 20 is disposed opposite the relief port and extends from the casing above the valve seat 7, the bore of the discharge port having communication with the bore 6 of the casing and being of conical shape to receive the nose 21 of the stem 22 formed integral with the service pipe 23. A union is threaded on the stem 22 and is held thereon by a lock nut 25. The inner end of the union engages over the discharge port and disposed between the union and discharge port are a series of spring packing rings 26 which establish a fluid tight connection between the union and port when the service pipe is connected to the discharge port. The union 24 is provided with oppositely extending trunnions 27 which pivotally support the yoke member 28 and arms 29 secured to the trunnions by pivot screws 29'. The arms 29 extend transversely of the valve casing with their free ends bent at right angles, as at 30, for engagement with the lock pinions 31 of a combination lock 32 formed integral with the valve casing.

A bushing 33 is threaded in the upper end of the valve casing having a central opening to receive the reciprocating valve stem 34. A valve disk 35 is fixedly secured on the lower end of the valve stem by a nut 36, for engagement with the valve seat 8. A second valve disk 37 is slidably mounted on the valve stem above the seat 7 which when engaged with the seat 7 closes the discharge port so that foreign matter cannot enter the valve casing when the service pipe is disconnected. The seating faces of the valve disks 35 and 37 are both covered with suitable packing 38 and 39. A head 40 is attached to the upper end of the valve stem 34 and an expansion spring 41 is mounted on the stem beneath the head which is seated in the bushing 33 and normaly holds the valve disk 35 closed. A bonnet 42 is threaded on the upper end of the valve casing and a slidable plunger 43 is carried by the bonnet in axial alinement with the valve stem. A series of flexible diaphragms 44 are interposed between the plunger 43 and head 40 of the valve stem being held at their peripheries by the bonnet. The diaphragms establish a fluid tight joint between the bonnet and valve casing and normally hold the plunger 43 in a raised position.

The yoke member 28 has its stem 45 curved for engagement with the upper end of the plunger 43, the stem having an adjustable bearing plate 46 secured in place by set screws 47. A latching lever 48 is pivotally attached to the end of the stem 45, as at 49, and is adapted to swing downwardly into engagement with the lock pinion 50 which enters an aperture in the end of the lever, thus securely holding the yoke member in applied position.

In operation, the valve casing 5 is attached to the tank containing the gases, it being apparent that an adapter may be used to attach the valve to various types of tanks. The service pipe 23 is then connected to the discharge port 20 by engaging the nose 21 of the stem 22 in the bore of the port, with the union 24 fitting over the port, whereupon, the arm 29 is swung downwardly into engagement with the lock pinion 31, drawing the nose 21 and union into tight engagement with the discharge port. The valve is now ready to be opened and the yoke member 28 is swung towards the valve casing, thus bringing the bearing plate 46 into engagement with the plunger 43, so that when the latching lever 48 is swung downwardly into engagement with the arm 29, the plunger 43 will be depressed. The downward movement of the plunger 43 will depress the valve stem 34 and compress the spring 41, thus unseating the valve disk 35, which allows the gases to pass from the tank to the service line. Upon release of the latching lever 48, the valve stem 34 is moved upwardly under the action of the spring 41, thus seating the valve 35 and shutting off the flow of gases. When the valve 35 is closed the valve 37 is seated by gravity and closes the bore of the discharge port, so that when the service line is disconnected dirt and other foreign matter cannot enter the valve casing to interfere with the proper seating of the valve 35. If there is an excessive pressure of gas in the tank when the valve 35 is closed, the relief valve 12 will be automatically unseated and the excess pressure exhausted through the apertures 15. Thus, it is seen I have provided simple and efficient means for connecting the service line to the valve casing, together with means for opening and closing the valve which will prevent injury to the valve parts and avoid neglect on the part of the service men when connecting the tank with the service line. It also prevents tampering with the valve by unauthorized persons and insures proper service with a minimum wear on the working parts of the valve.

It is to be understood that the form of my invention herein shown and described is to be taken as a preferred example of the same and that certain changes in the shape, size and arrangement of the parts may be made without departing from the spirit of the invention or the scope of the subjoined claims.

Having thus described my invention, I claim:—

1. A valve of the character described comprising a casing having a longitudinal bore and lateral outlet leading therefrom, a reciprocating valve mounted in the bore of said casing, a plunger mounted in the top of said casing for controlling the opening and closing of said valve, a service pipe coupling for engaging the lateral outlet of said casing, an arm carried by said coupling for engagement with said casing to secure the coupling in fluid tight engagement with the outlet and means carried by said coupling for operating said plunger to open said valve when the coupling is in secured position.

2. A valve of the character described comprising a casing having a longitudinal bore provided with a lateral discharge port, a reciprocating valve mounted in the bore of said casing, a plunger mounted in the top of said casing for controlling the opening and closing of said valve, a service pipe coupling for engaging said discharge port, a pivoted member carried by said coupling for depressing said plunger to open said valve and an adjustable bearing plate carried by said lever for contact with said plunger.

3. A valve of the character described comprising a valve casing having a longitudinal bore provided with a lateral discharge port and opposed valve seats below the discharge port, a valve stem mounted to reciprocate in said bore, a fixed valve on the lower end of said stem for engagement with the lower valve seat, a slidable valve on said stem for engagement with the upper valve seat, a spring mounted on said stem normally holding said fixed valve in closed position, a plunger mounted in the top of said casing for depressing said stem to open said fixed valve and means for holding said plunger depressed.

4. A valve of the character described comprising a valve casing having a longitudinal bore provided with a valve seat intermediate its length, a reciprocating valve mounted in said bore for engagement with said seat, a discharge port above said valve seat, a relief port below said valve seat, a spring pressed valve for controlling said relief port, a plunger mounted in the top of said casing for operating said reciprocating valve, a service pipe coupling adapted to engage with said discharge port, an arm carried by said coupling for engagement with the casing to hold said coupling in fluid tight engagement with the discharge port, a lever carried by said coupling for depressing said plunger when the coupling is engaged with the discharge port and means for holding said lever in operative engagement with said plunger.

5. The combination with a valve for high pressure tanks, of a coupling for engagement with the discharge port of the valve, an arm carried by said coupling, means on the valve for engagement with said arm to hold said coupling in fluid tight engagement with said port, a lever carried by said coupling adapted to open the valve when the coupling is engaged with the discharge port and means for holding said lever in operative position.

6. The combination with a valve for high pressure tanks, of a coupling for engagement with the discharge port of the valve, an arm carried by said coupling for engagement with the valve casing to hold said coupling in fluid tight engagement with the discharge port, a lever carried by said coupling for opening said valve when the coupling is engaged with the discharge port and means on the valve casing for locking said arm and lever in operative position.

7. A valve of the character described comprising a valve casing having a longitudinal bore provided with a valve seat intermediate its length, a reciprocating valve mounted in said bore for engagement with said seat, a discharge port above said valve seat, a spring normally holding said valve in a closed position, a plunger mounted in said valve casing for opening said valve, a service pipe coupling adapted to engage with said discharge port, an arm carried by said coupling for engagement with said casing to hold said coupling in fluid tight engagement with the discharge port, a lever carried by said coupling for depressing said plunger when the coupling is engaged with the discharge port and means for holding said arm and lever in operative position.

8. A valve of the character described comprising a valve casing having a longitudinal bore provided with a valve seat intermediate its length, a reciprocating valve mounted in said bore for engagement with said seat, a discharge port above said valve seat, a spring normally holding said valve in closed position, a plunger mounted in the top of said valve casing for depressing said valve to open the same, a lock mounted on said valve casing in opposed relation to said discharge port, a service pipe coupling adapted to engage with said discharge port, arms pivotally mounted on said coupling adapted to straddle said valve casing and engage with said lock to hold said coupling in fluid tight engagement with the discharge port, a lever pivotally mounted on said coupling for depressing said plunger when the coupling is engaged with the discharge port and a latching arm connected with said lever for engagement with said lock for securing said lever in operative position.

PIERRE A. BOUCHARD.